US010708753B2

(12) United States Patent
Garty et al.

(10) Patent No.: US 10,708,753 B2
(45) Date of Patent: *Jul. 7, 2020

(54) DISCOVERY AND SERVICE MAPPING OF SERVERLESS RESOURCES

(71) Applicant: ServiceNow, Inc., Santa Clara, CA (US)

(72) Inventors: Asaf Garty, Sdei Hemed (IL); Haviv Rosh, Modiin (IL); Noam Biran, Kfar Menachem (IL); Hail Tal, Kohav Yair (IL)

(73) Assignee: ServiceNow, Inc., Santa Clara, CA (US)

( * ) Notice: Subject to any disclaimer, the term of this patent is extended or adjusted under 35 U.S.C. 154(b) by 95 days.

This patent is subject to a terminal disclaimer.

(21) Appl. No.: 15/944,523

(22) Filed: Apr. 3, 2018

(65) Prior Publication Data
US 2019/0306691 A1   Oct. 3, 2019

(51) Int. Cl.
| | | |
|---|---|---|
| H04L 12/24 | (2006.01) | |
| H04W 8/00 | (2009.01) | |
| H04W 24/02 | (2009.01) | |
| H04L 29/08 | (2006.01) | |
| H04W 48/16 | (2009.01) | |

(52) U.S. Cl.
CPC .......... *H04W 8/005* (2013.01); *H04L 41/085* (2013.01); *H04L 67/16* (2013.01); *H04W 24/02* (2013.01); *H04W 48/16* (2013.01)

(58) Field of Classification Search
None
See application file for complete search history.

(56) References Cited

U.S. PATENT DOCUMENTS

| | | |
|---|---|---|
| 5,978,594 A | 11/1999 | Bonnell |
| 6,321,229 B1 | 11/2001 | Goldman |
| 6,816,898 B1 | 11/2004 | Scarpelli |

(Continued)

OTHER PUBLICATIONS

U.S. Appl. No. 16/365,353, filed Aug. 2019, Garty et al.*

(Continued)

*Primary Examiner* — Ayaz R Sheikh
*Assistant Examiner* — Sori A Aga
(74) *Attorney, Agent, or Firm* — Fletcher Yoder PC

(57) ABSTRACT

A computing system may include a database disposed within a remote network management platform that manages a managed network, and a software application associated with the platform. The software application may be configured to: obtain a unit of programmatic code from a third-party computing system, where the unit of programmatic code is hosted by the third-party computing system on behalf of the managed network, and where a program using the unit of programmatic code is executable by computing resources of the third-party computing system that are assigned on demand; parse the unit of programmatic code for a pattern indicative of respective relationships between the unit of programmatic code and service(s) provided by the third-party computing system; generate an association between the unit of programmatic code and the service(s); and store, in the database, representations of the unit of programmatic code, the service(s), and the association therebetween as discovered configuration items.

20 Claims, 10 Drawing Sheets

(56) References Cited

U.S. PATENT DOCUMENTS

| | | |
|---|---|---|
| 6,895,586 B1 | 5/2005 | Brasher |
| 7,027,411 B1 | 4/2006 | Pulsipher |
| 7,293,080 B1 * | 11/2007 | Clemm .................. H04L 47/10 709/223 |
| 7,392,300 B2 | 6/2008 | Anantharangachar |
| 7,617,073 B2 | 11/2009 | Trinon |
| 7,877,783 B1 | 1/2011 | Cline |
| 7,945,860 B2 | 5/2011 | Vamenepe |
| 8,554,750 B2 | 10/2013 | Rangaranjan |
| 8,874,704 B2 | 10/2014 | Nath |
| 9,215,270 B2 | 12/2015 | Mohaban et al. |
| 9,569,180 B1 | 2/2017 | Jiang et al. |
| 9,608,932 B2 | 3/2017 | DeCusatis et al. |
| 9,935,838 B2 | 4/2018 | Lin |
| 10,044,566 B1 | 8/2018 | Grisco |
| 10,091,067 B2 | 10/2018 | Langston |
| 10,148,493 B1 | 12/2018 | Ennis |
| 2011/0302569 A1 | 12/2011 | Kunze et al. |
| 2012/0198073 A1 | 8/2012 | Srikanth |
| 2014/0372533 A1 | 12/2014 | Fu et al. |
| 2015/0341230 A1 | 11/2015 | Dave |
| 2016/0182299 A1 | 6/2016 | Polinati |
| 2018/0146049 A1 | 5/2018 | Africa |
| 2018/0316552 A1 * | 11/2018 | Subramani Nadar ........................ H04L 41/5054 |
| 2018/0322556 A1 | 11/2018 | Padmanabh |
| 2018/0373774 A1 | 12/2018 | Rangarajan |

OTHER PUBLICATIONS

Extended European Search Report for European Application No. 19166611.4 dated Jun. 17, 2019; 10 pgs.

Magnus Bjorkman, "AWS Developer Blog—Serverless Service Discovery—Part 1: Get Started", Apr. 18, 2016, https://aws.amazon.com/blogs/developer/serverless-service-discovery-part-1-get-started/.

BMC Helix Platform Datasheet (obtained Mar. 21, 2019 from www.bmc.com; 2 pages).

BMC Control-M Automation API Datasheet (obtained Mar. 21, 2019 from www.bmc.com; 2 pages).

* cited by examiner

US 10,708,753 B2

DISCOVERY AND SERVICE MAPPING OF SERVERLESS RESOURCES

BACKGROUND

In practice, management of a network may involve gathering information regarding the configuration and operational aspects of the network. Traditionally, computing devices and applications operating on or associated with such a network were viewed in isolation. Thus, it was difficult to determine the impact that a problem with a particular computing device or application will have on service(s) provided by or to the network. Service mapping is a set of operations through which a remote network management platform or other entity can discover and organize these computing devices and applications, and represent the relationships therebetween.

SUMMARY

Service mapping facilitates the representation of the hardware and software components associated with a managed network. This may involve visually representing these components and the relationships between them in the form of a service map on a graphical user interface. Doing so allows the relationships to be easily understood. From time to time, this service map may be updated as the hardware and software components change, or in order to correct or otherwise improve the service map.

In some situations, however, a managed network may use services of a third-party computing system, which may raise various challenges for facilitating service mapping.

By way of example, the third-party computing system may provide a cloud-based service that allows a user of the managed network to upload a unit of programmatic code, so that the unit of programmatic code is hosted by the third-party computing system, thereby offloading resource allocation and management of the unit of programmatic code to the third-party computing system. In practice, a program using the unit of programmatic code may be executed in response to a trigger event, which may be initiated by one of various entities, such as, for example, by a client device on the managed network and/or by an application on the internet, among other possibilities. In this regard, the program using the unit of programmatic code may be executable by computing resources of the third-party computing system. These computing resources may be assigned on demand, which effectively allows the managed network to use computing resources of the third-party computing system on an as-needed basis for executing the hosted unit of programmatic code.

In some cases, execution of a program using the unit of programmatic code may trigger usage of other service(s) provided by the third-party computing system. Yet, service mapping may not discover respective relationships between the unit of programmatic code and these other service(s) provided by the third-party computing system, because the third-party computing system may not have any specific computing resources dedicated to execution of the program using the unit of programmatic code, as such computing resources are assigned on demand as noted above. Thus, these respective relationships may not be easily understood.

Disclosed herein is a software application that is configured to discover respective relationship(s) between a unit of programmatic code remotely hosted for execution on a third-party computing system and other service(s) provided by the third-party computing system and/or by another computing system, so as to help facilitate service mapping. This software application could be configured to execute on a server device within a remote network management platform and/or on a server device within a managed network, among other possibilities.

In accordance with the present disclosure, the software application may obtain the unit of programmatic code from the third-party computing system, and may then parse the unit of programmatic code for a pattern indicative of respective relationships between the unit and other service(s). For example, the software application may determine that the unit of programmatic code includes a particular address (e.g., a uniform resource locator (URL)) that has a particular format and that identifies a particular service in accordance with the particular format.

After parsing the obtained unit of programmatic code, the software application may generate an association between the unit and the service(s) with which respective relationship(s) were discovered during the parsing. The software application may then store, in a database, representations of the unit of programmatic code, the discovered service(s), and the association therebetween. In some cases, the software application could also generate a service map for display by a client device of a managed network via a graphical user interface. This service map may represent the unit of programmatic code as a node, the discovered service(s) as respective node(s), and the association therebetween as one or more links.

In this way, the software application may help discover relationship(s) between the unit of programmatic code and other service(s), and do so independently from the above-described on demand execution of the program using the unit of programmatic code. Other advantages are possible as well.

Accordingly, a first example embodiment may involve a computing system including (i) a database disposed within a remote network management platform that manages a managed network and (ii) a software application associated with the remote network management platform. The software application may be configured to carry out discovery of serverless resources using operations including: obtaining a unit of programmatic code from a third-party computing system, where the unit of programmatic code is hosted by the third-party computing system on behalf of the managed network, and where a program using the unit of programmatic code is executable by computing resources of the third-party computing system that are assigned on demand; parsing the unit of programmatic code for a pattern indicative of respective relationships between the unit of programmatic code and one or more services provided by the third-party computing system or by another computing system; based on the pattern being present in the unit of programmatic code, generating an association between the unit of programmatic code and the one or more services; and storing, in the database, representations of the unit of programmatic code, the one or more services, and the association therebetween as discovered configuration items.

A second example embodiment may involve obtaining, by a computing system, a unit of programmatic code from a third-party computing system, where the computing system includes a database disposed within a remote network management platform that manages a managed network, where the unit of programmatic code is hosted by the third-party computing system on behalf of the managed network, and where a program using the unit of programmatic code is executable by computing resources of the third-party computing system that are assigned on demand. The second example embodiment may also involve parsing, by the computing system, the unit of programmatic code for a pattern indicative of respective relationships between the unit of programmatic code and one or more services provided by the third-party computing system or by another computing system. The second example embodiment may further involve, based on the pattern being present in the unit of programmatic code, generating, by the computing system, an association between the unit of programmatic code and the one or more services. The second example embodiment may yet further involve storing, by the computing system in the database, representations of the unit of programmatic code, the one or more services, and the association therebetween as discovered configuration items.

In a third example embodiment, an article of manufacture may include a non-transitory computer-readable medium, having stored thereon program instructions that, upon execution by a computing system, cause the computing system to perform operations in accordance with the first and/or second example embodiments.

In a fourth example embodiment, a computing system may include at least one processor, as well as memory and program instructions. The program instructions may be stored in the memory, and upon execution by the at least one processor, cause the computing system to perform operations in accordance with the first and/or second example embodiments.

In a fifth example embodiment, a system may include various means for carrying out each of the operations of the first and/or second example embodiments.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
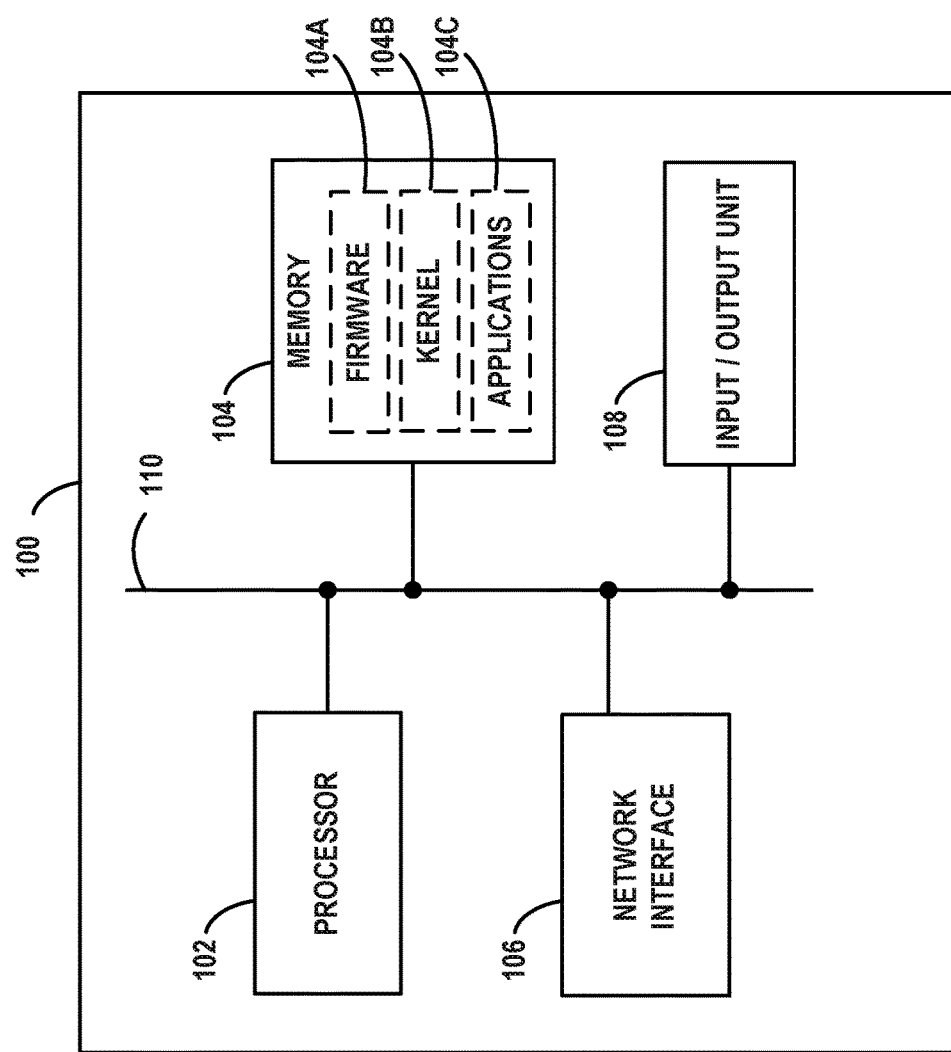
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
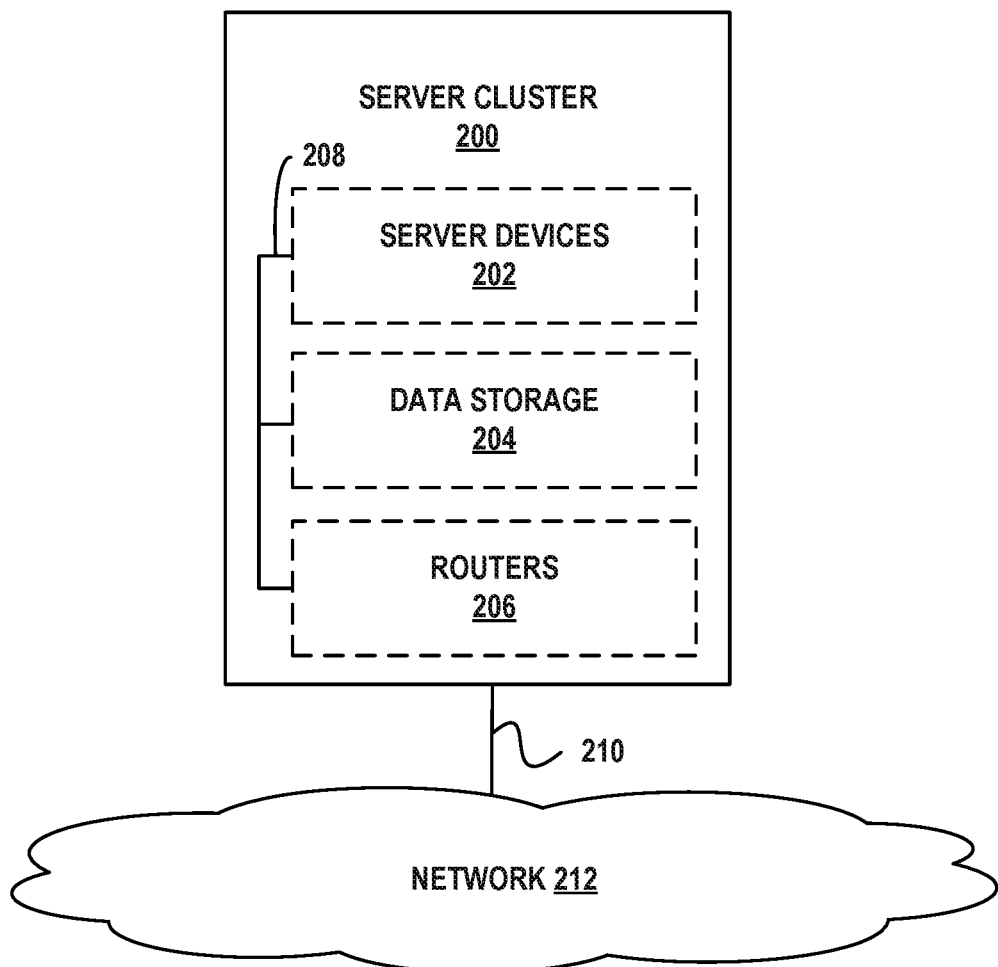
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
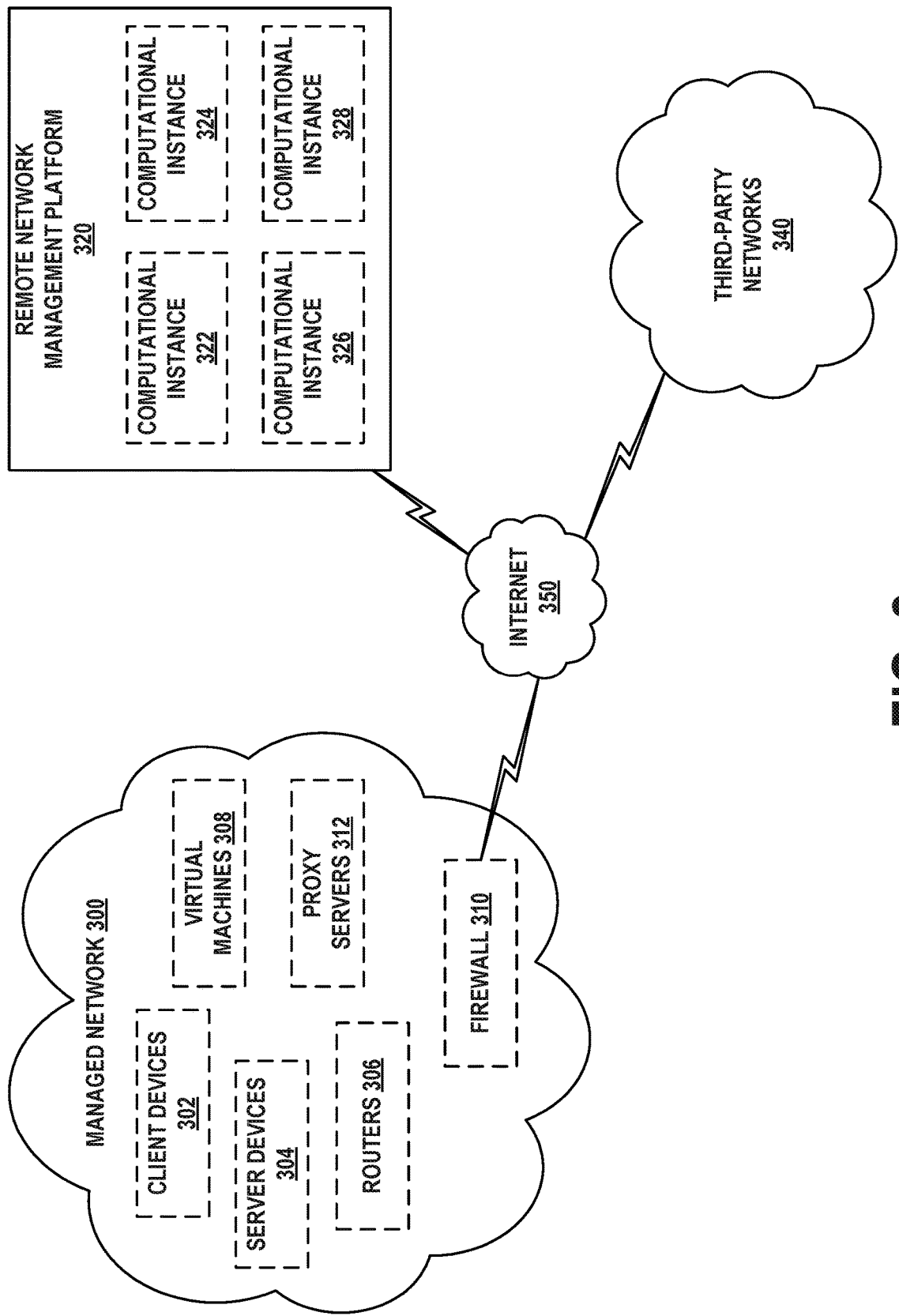
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation.

Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
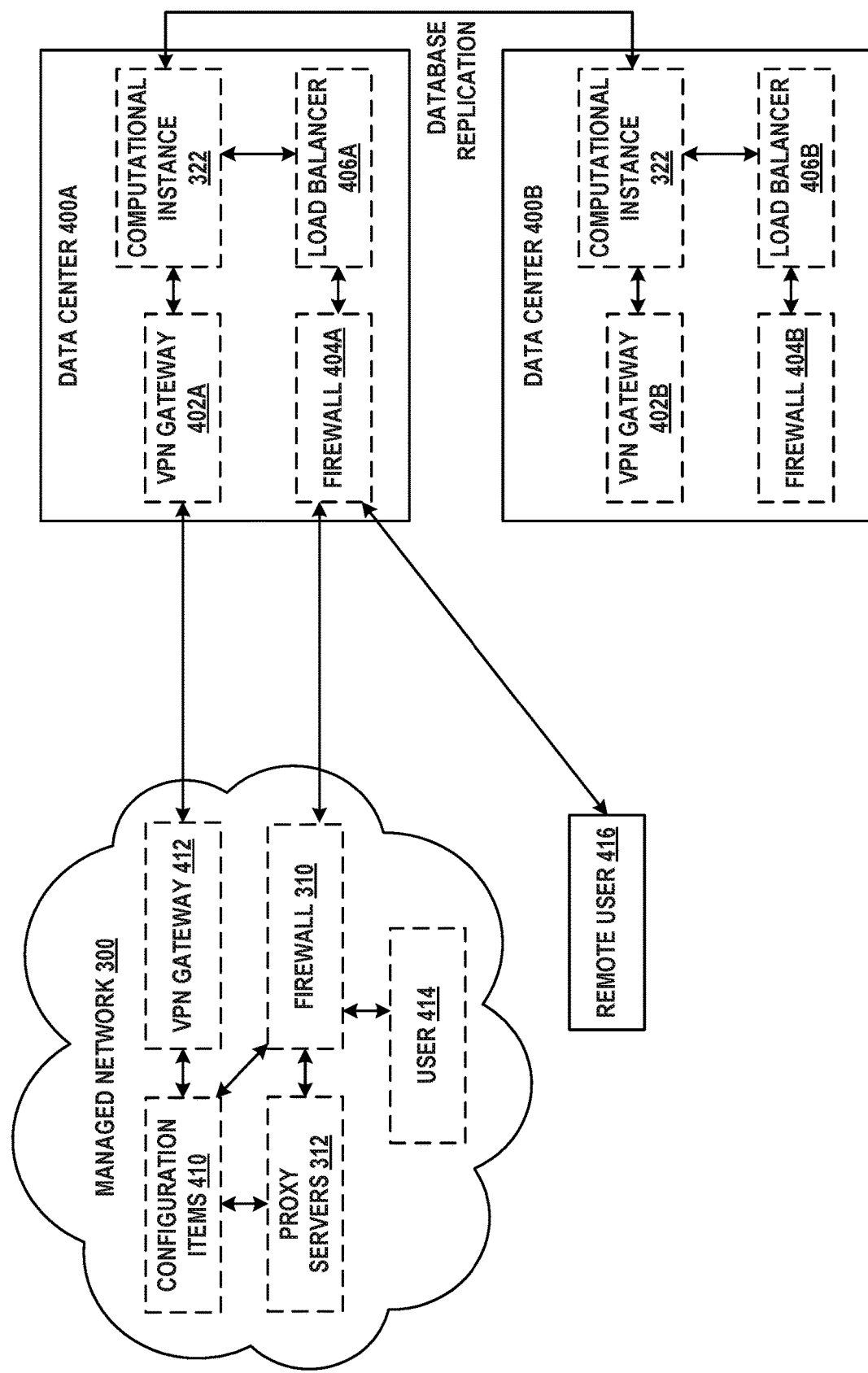
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
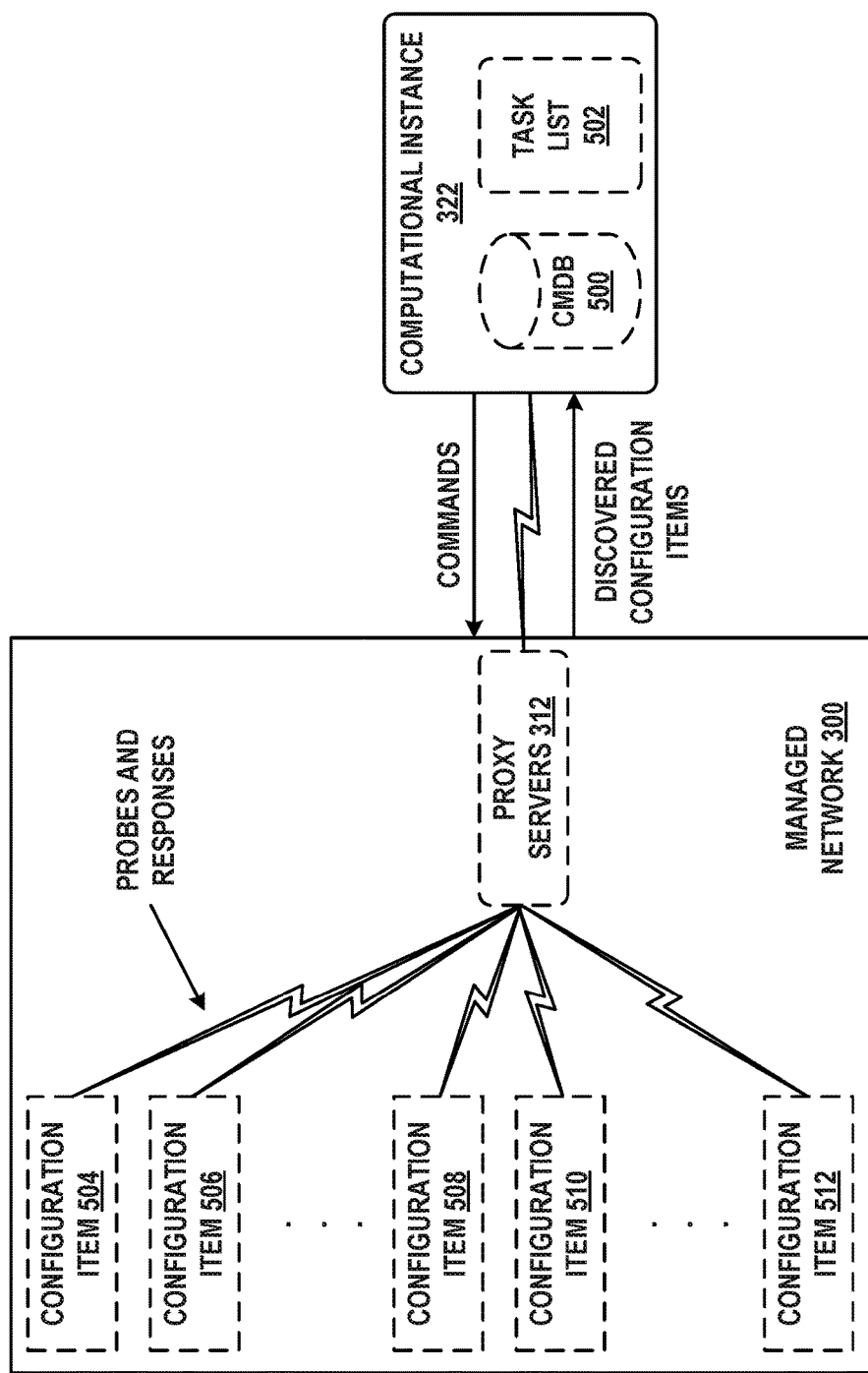
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
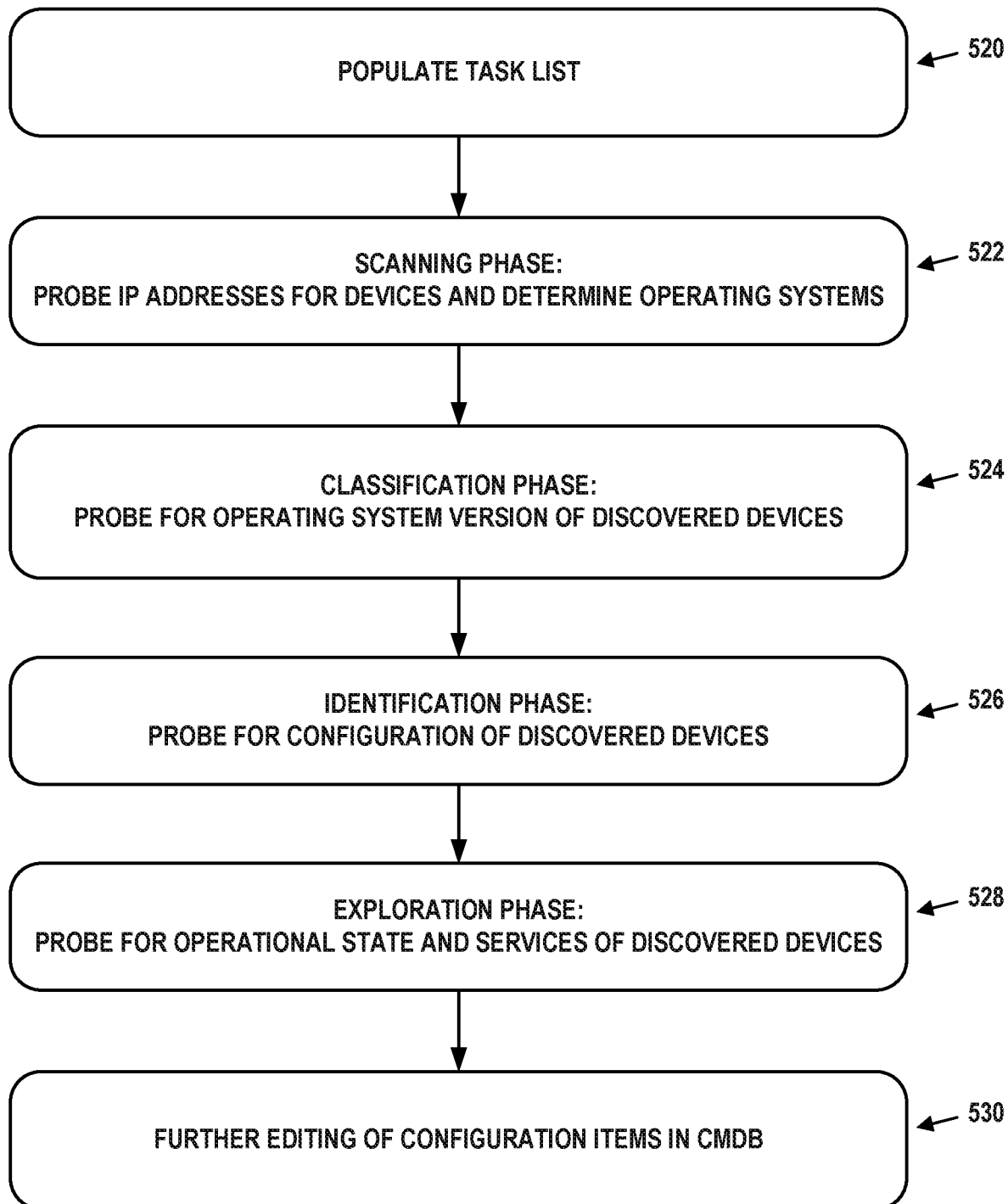
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. CMDB IDENTIFICATION RULES AND RECONCILIATION

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. EXAMPLE SERVICE MAPPING

Service mapping may involve a computational instance obtaining information related to sets of interconnected computing devices and applications, operating on a managed network, that are configured to provide a service. This service may either be provided internally to the managed network (e.g., an organizational email service) or externally to customers of the managed network (e.g., an external web site). Service mapping builds viewable maps of the configuration items (e.g., the computing devices, applications, and any related configuration information or profiles) used to provide the service. Dependencies between these configuration items may be based on relationships between the computing devices and applications.

Thus, a service map may be a visual representation on a web-based GUI, for instance, that depicts particular applications operating on particular computing devices in the managed network as nodes in a graph. The links of the graph may represent physical and/or logical network connectivity between these nodes. This visual representation allows users to rapidly determine the impact of a problematic configuration item on the rest of the service. For instance, rather than viewing, in isolation, the properties of a database application, this application can be represented as having connections to other applications and the computing devices that rely upon or support the application. Thus, if the database is exhibiting a problem (e.g., running out of storage capacity), the impacted service(s) can be efficiently determined.

Discovery procedures may be used, at least in part, to determine the relationships between computing devices and applications that define services. Alternatively or additionally, services and/or components thereof may be manually defined after discovery has at least partially completed. From this information, a service map can be derived.

VII. EXAMPLE DISCOVERY AND SERVICE MAPPING OF SERVERLESS RESOURCES

Generally, traditional discovery procedures have lacked the ability to help with discovery of "serverless resources". In particular, traditional discovery procedures involve finding a device and logging onto the device to determine applications and/or other services that could run on it. However, in some situations, applications and/or other services may be serverless resources, as there may not be any specific computing resources (e.g., a computing device) dedicated to execution of such applications and/or other services. For example, a unit of programmatic code may be remotely hosted, on behalf of a managed network, for on demand execution on a third-party computing system, and the third-party computing system may not have any specific computing resources dedicated to execution of a program using the unit of programmatic code. Herein, the term "unit of programmatic code" may refer to any type of program code related to software or programming. Nonetheless, because there may not be any specific computing resources dedicated to execution of certain applications and/or other services, traditional discovery procedures may not discover such applications and/or other services.

Disclosed herein is a software application that can discover serverless resources, as the software application may be configured to carry out discovery procedure(s) that do not require finding and logging onto device(s). Given this, the software application may be configured to discover and store information about respective relationship(s) between a unit of programmatic code remotely hosted for execution on a third-party computing system and other service(s) provided by the third-party computing system and/or by another computing system, so as to help facilitate service mapping. The software application may discover such relationship(s) even if the third-party computing system does not have any specific computing resources dedicated to execution of a program using the unit of programmatic code. Thus, the software application could provide information to an enterprise that may help the enterprise better assess its managed network's usage of various services.

Figure 6:
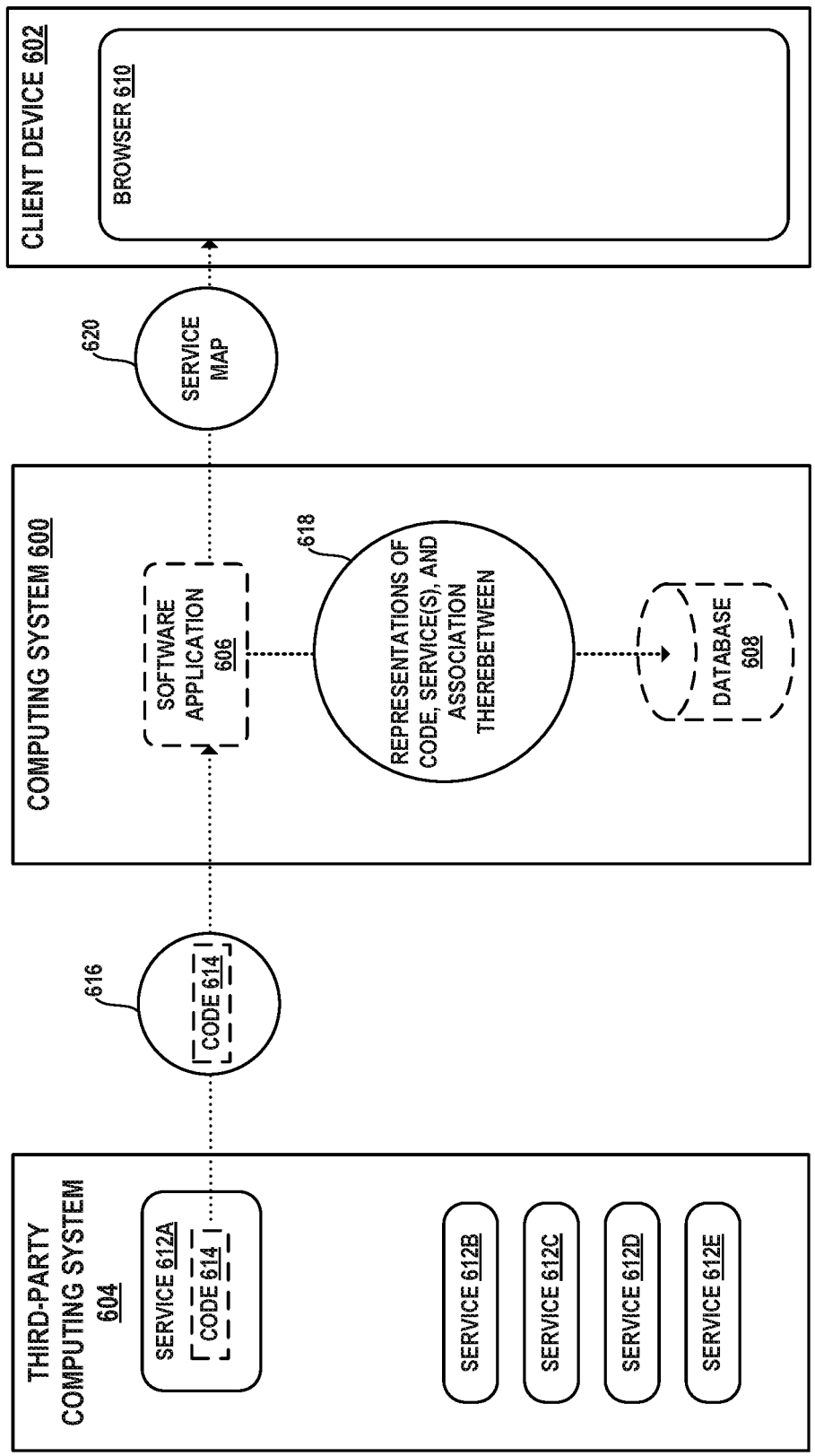
FIG. 6 depicts communications between a computing system, a client device, and a third-party computing system, in accordance with example embodiments.

FIG. 6 illustrates features, components, and/or operations of a computing system 600, of a managed network's client device 602, and of a third-party computing system 604 that provides service(s) to the managed network. Although FIG. 6 illustrates a specific arrangement, various operations disclosed herein may be carried out in the context of similar and/or other arrangement(s) as well without departing from the scope of the present disclosure.

Specifically, computing system 600 may include software application 606, which may help discover and store information about respective relationship(s) in line with the discussion above. The software application 606 may include or otherwise take the form of program instructions executable by processor(s) of the computing system 600, so as to cause the computing system 600 to carry out various operations describe herein. To that end, the software application 606 may be configured to execute on a server device disposed within a remote network management platform, such as remote network management platform 320, and/or on a server device (e.g., proxy server) disposed within a managed network, such as the client device 602's managed network. Thus, the computing system 600 could include features and/or components of a managed network and/or of a remote network management platform that supports remote management of the managed network.

Additionally, as shown, the computing system 600 may include a database 608. This database 608 could be a CMDB of a computational instance, such as CMDB 500 for example. Additionally or alternatively, database 608 may be a database that is different from a CMDB found within the remote network management platform.

Although computing system 600 is shown to include certain features and/or components, computing system 600 may include any feasible combination of features and/or components, so as to facilitate aspects of the present disclosure. For example, the computing system 600 may also include one or more server devices (not shown) that engage in communications with client device 600 and/or with the third-party computing system 604.

Further, as noted, FIG. 6 also illustrates a client device 602, which may be one of the client devices 302 on the managed network 300 for example. Generally, the client device 602 may engage in communication with computing system 600, such as via wired and/or wireless communication link(s) (not shown). Moreover, as shown, the client device 600 may be configured to operate a web browser 610, which is an application that may retrieve, present, and/or navigate through information on the World Wide Web and/or on private websites.

The browser 610 may include a web-display tool (not shown) that provides for or otherwise supports display of information, such as information received from computing system 600. For example, as further discussed herein, the web-display tool may display a visual representation of a service map for service(s) provided by the third-party computing system 604.

Third-party computing system 604 may provide various services 612A-612E, which may be accessible to and can be used by the client device 602's managed network on demand, such as via a cloud-based platform. For example, the third-party computing system 604 may be a computing system of AMAZON WEB SERVICES®, which provides on demand cloud computing platforms. Although five services are shown, any number of services could be provided without departing from the scope of the present disclosure.

Generally, services 612A-612E could each respectively take on various forms and could each respectively provide function(s), feature(s), and/or component(s) for the benefit of the managed network. For example, services of the third-party computing system may include web-based applications, such as an e-mail service, a service for building web-based applications, and/or a service for testing web-based applications, among other possibilities. In another example, third-party database(s) provided by the third-party computing system could be considered to be a service provided by the third-party computing system, as such third-party database(s) could be used for storage of certain information on behalf of the managed network, among other options. In yet another example, third-party server device(s) provided by the third-party computing system could be considered to be a service provided by the third-party computing system, as such third-party server device(s) could provide processing resource(s) to carry out operations on behalf of the managed network.

In a more specific example, service 612A may allow a user to upload a unit of programmatic code 614 (hereinafter "code 614") to the third-party computing system 604 via the managed network (e.g., using client device 602), so that the code 614 is remotely hosted and executable by the third-party computing system 604 on behalf of the managed network. In practice, service 612A may be, for example, the AWS LAMBDA® platform provided by AMAZON WEB SERVICES®.

Thus, the service 612A may allow an enterprise to offload resource allocation and management of the code 614 to the third-party computing system. Moreover, the service 612A may help reduce usage of computational resources on the managed network, as the service 612A may eliminate the need to store the code 614 on database(s) of the managed network and/or to execute the code 614 using server device (s) of the managed network.

In practice, the code 614 could take various forms. For example, the code 614 may be or may otherwise include source code, which may be a collection of computer instructions written in one or more programming languages as plain text. In another example, the code 614 may be or may otherwise include object code, which may be statements or instructions in a computer language as produced by a compiler. In yet another example, the code 614 may be or may otherwise include configuration file, which may be a file that specifies parameters and/or initial settings for a computer program. In yet another example, the code 614 may be or may otherwise include a log file, which may be a file that includes records of events and/or communications that occur in association with certain software. In yet another example, the code 614 may be or may otherwise include an environmental variable, which may be a dynamically-named variable that is mapped to other program variable(s) and that affects execution of program(s) using the code 614 in accordance with this mapping. Other examples are also possible.

Given this, in some situations, a program on the third-party computing system 604 may include other executable code and may utilize at least a portion of the code 614. Whereas, in other situations, the code 614 may be the program itself. In any case, for sake of simplicity, the present disclosure is described in the context of the program using the code 614, which could relate to either one of these situations, among others.

Generally, a program using the code 614 may be executed in response to a trigger event. For example, the trigger event could involve transmission, to the service 612A, of a request for the program using the code 614 to execute, so that an entity initiating the trigger event and/or another entity receives certain information and/or carries out operations as a result of execution of the program using the code 614, among other options. Such a request could also include other information that the program may use in accordance with the code 614 during execution. Other examples are also possible.

Accordingly, the trigger event at issue could be initiated by one or more of various entities. For example, the trigger event could be initiated by the software application 606. In another example, the trigger event could be initiated by a different software application that is associated with the remote network management platform. In yet another example, the trigger event could be initiated by a software application associated with the third-party computing system, such as by a web-based application related to one of the services 612B-612E, for example. In yet another example, the trigger event could be initiated by a software application operating on a client device remotely accessing the third-party computing system 604. Other examples are also possible.

Further, the program using the code 614 may be executable by computing resources of the third-party computing system 604. These computing resources may be assigned on demand, which effectively allows the managed network to use computing resources of the third-party computing system 604 on an as-needed basis for executing the remotely hosted unit of programmatic code. Given that computing resources are assigned on demand, the third-party computing system 604 may not have any specific computing resources dedicated to execution of the program using the code 614. Thus, the code 614 is considered to be a "serverless resource".

Moreover, execution of the program using the code 614 may trigger usage of one or more other services, such as one or more of the services 612B-612E provided by the third-party computing system 604 and/or service(s) provided by another computing system (e.g., another third-party computing system that is different from system 604). For example, the code 614 could trigger a request for certain information from one or more of the other service(s) 612B-612E. In another example, the code 614 could trigger a transmission of certain information to one or more of the other service(s) 612B-612E. In yet another example, the code 614 could cause one or more of the other service(s) 612B-612E to carry out certain operation(s). Other examples are also possible.

Because execution of the program using the code 614 may trigger usage of one or more other service(s), it may be beneficial for various reasons to discover respective relationship(s) between the code 614 and other service(s) in accordance with such usage. For example, it may be beneficial for an enterprise to discover that code uploaded by one of its users relates to one or more of the other service(s) 612B-612E, because usage of such other service(s) may have associated costs to the enterprise. Other examples are also possible.

However, given that the third-party computing system 604 may not have any specific computing resources dedicated to execution of the program using the code 614, existing service mapping approaches may not discover the respective relationships between the code 614 and other service(s). Therefore, the enterprise that uploaded the code 614 might otherwise be unable to ascertain these relationships.

To help address these challenges, software application 606 may be configured to discover and store information about respective relationship(s) between the code 614 and other service(s). The software application 606 may do so even if the third-party computing system 604 does not have any specific computing resources dedicated to execution of the program using the code 614. Moreover, the software application 606 may do so independently from this program being executed by computing resources of the third-party computing system 604. As such, dedicated computing resources and program execution are not necessary for the software application 606 to carry out such discovery and subsequent storage of relevant and useful information about the respective relationship(s).

In order to discover the respective relationship(s), the software application 606 may obtain a representation 616 of the code 614, as shown in FIG. 6. In one example, the representation 616 could be a file having a format that is machine-readable, such as a format arranged for the programming language in which the code 614 was written (e.g., a ".PY" file for code written in the Python programming language). In another example, the representation 616 could be a file having a different format, such as an Extensible Markup Language (XML) file or a text file, among other possibilities. Other examples are also possible.

Further, the software application 606 could obtain the representation 616 in various ways. For example, the software application 606 may transmit, to the third-party computing system 604, a request for the code 614. The software application 606 may then receive the code 614 from the third-party computing system 604 in response to the request. In a more specific example, the software application 606 may include, communicate with, or otherwise have access to an application programming interface (API) associated with service 612A, and thus may use an API call to facilitate the request. Other examples are also possible.

Moreover, the software application 606 could obtain various types of information as part of and/or in addition the representation 616. For example, assuming that the code 614 is source code that was uploaded to the third-party computing system 604, obtaining the representation 616 may involve obtaining this source code as well as configuration file(s), log file(s), and/or environmental variable(s) that were also uploaded, manually configured, and/or that were generated as a result of execution of the source code, among other possibilities. In another example, the software application 606 may obtain information about a time that the code 614 was loaded, about a user that uploaded the code 614, and/or about a client device of the managed network that was used to upload the code 614, among others. Other examples are also possible.

Once the software application 606 obtains the representation 616 of the code 614, the software application 606 may parse the code 614 for a pattern indicative of respective relationships between the code 614 and service(s) provided by the third-party computing system 604 and/or by another computing system. To carry out such parsing, the software application 606 could include any currently available or future-developed parser as a software component, which could carry out pattern identification and matching based on input data (e.g., representation 616), such as using regular expressions, among other possibilities.

Generally, the code 614 may include various variables that effectively guide execution of the code 614, and some of these variables may indicate respective relationships between the code 614 and one or more services. In practice, a given variable may indicate a relationship to a service if it is in a certain format and identifies a certain service in accordance with that format. As such, the software application 606 may parse the code 614 for the above-mentioned pattern by determining that the code 614 includes a particular variable that has a particular format and that identifies a particular service in accordance with the particular format.

To facilitate this, the software application 606 may have access to formatting information, which may be contained in database 608, in another database disposed with the remote network management platform and/or in a third-party database of the third-party computing system 604, among other options. In some cases, the formatting information could be encoded in the software application 606. In any case, this formatting information may specify a unique format respectively for each of a plurality of types of services provided by the third-party computing system 604 and/or by another computing system. Accordingly, the software application 606 may use the formatting information as basis for determining that the code 614 includes the particular variable.

In one case, a variable indicative of a relationship to a service could be a universal resource locator (URL) or a fully qualified domain name (FQDN) that establishes a link from the code 614 to a particular service, or more specifically to a particular directory within the particular service.

For example, a URL having the format "[user].service612B.computingsystem604.com" may establish a link from the code 614 to service 612B shown in FIG. 6, and specifically to a directory within service 612B related to a specific user of the managed network in accordance with the specific language included in the "[user]" portion of the URL. Given this, the formatting information could specify that a URL in this format indicates a relationship to service 612B. Thus, if the software application 606 determines, for example, that the code 614 includes a URL of "user123.service612B.computingsystem604.com", then the software application 606 may determine, based on the formatting information, that this URL indicates a relationship between the code 614 and service 612B. A similar approach may apply in the context of an FQDN.

In another case, a variable indicative of a relationship to a service could be a name that identifies or establishes connectivity to a particular service, or more specifically a particular directory within the particular service. In some cases, such a variable could be a resource name that identifies or establishes connectivity to a service such as a particular web-based application, a particular third-party database, or a particular third-party server device, among other options. In other cases, such a variable could be a function name that identifies or establishes connectivity to another unit of programmatic code uploaded to the third-party computing system 604.

For example, a resource name having the format "computingsystem604: service612C:[account-id]" may identify service 612C shown in FIG. 6, and specifically identify a particular directory within service 612C related to a specific user of the managed network in accordance with the specific language included in the "[account-id]" portion of the resource name. Given this, the formatting information could specify that a resource name in this format indicates a relationship to service 612C. Thus, if the software application 606 determines, for example, that the code 614 includes a resource name of "computingsystem604:service612C:XYZ453", then the software application 606 may determine, based on the formatting information, that this resource name indicates a relationship between the code 614 and service 612C. A similar approach may apply in the context of function name.

In some cases, the code 614 may additionally or alternatively include environmental variable(s) that respectively map to values identifying service(s), such as those described above, for example. In practice, a given environmental variable may indicate a relationship to a service if it is mapped to a value that is in a certain format and that identifies this service in accordance with that format. As such, the software application 606 may parse the code 614 for the above-mentioned pattern by determining that the code 614 includes a particular environmental variable that is mapped to a particular value, and by determining that this particular variable has a particular format and identifies a particular service in accordance with the particular format.

To facilitate this, the software application 606 may have access to mapping information, which may be contained in database 608, another database disposed with the remote network management platform and/or in a third-party database of the third-party computing system 604, among other options. This mapping information may map a plurality of environmental variables to respective unique values or patterns of values. Thus, the software application 606 could use this mapping information as basis for determining that the code 614 includes a particular environmental variable and/or for determining the unique value or pattern of values to which this particular environmental variable is mapped.

By way of example, the software application 606 may determine that the code 614 includes an environmental variable "sv612D" mapping of "computingsystem604: service612D:XYZ123". Then, the software application 606 may determine, based on the formatting information, that this resource name indicates a relationship between the code 614 and service 612D. Given this, the software application 606 may effectively determine that environmental variable "sv612D" indicates a relationship between the code 614 and service 612D. Other examples are also possible.

In some cases, if the code 614 includes source code and/or a configuration file, the source code and/or configuration file may include comments. These comments are generally non-operative, as these comments may be text other than text which commands the program using the code 614 to carry out certain operations during execution. For example, comments may be non-operative due to being text in a language readable by a human rather than in a machine-readable language. In another example, non-operative comments may be any text in a line that follows particular type(s) of text or symbols, such as two forward-slashes (i.e. "//").

Given this, in some implementations, the software application 606 may be configured to identify non-operative comments and to ignore these non-operative comments when parsing the code 614 for the above-mentioned pattern. To facilitate this, the software application 606 may have access to a list of non-operative comments, such as to a list of words in the English language for example, and may use this list to identify and ignore non-operative comments in the code 614. For example, the software application 606 may identify the phrase "use for version 1 only" in the code 614 and may determine based on the list of English words that this phrase is a non-operative comment that should be ignored. Additionally or alternatively, the software application 606 may be configure to identify particular type(s) of text or symbols that indicate that subsequent text in the same line is a non-operative comment. For example, the software application 606 may identify "//" in the code 614 and may responsively ignore the "//" as well as subsequent text in the same line as the "//". Other examples are also possible.

Accordingly, given these parsing techniques, the software application 606 could discover respective relationships between the code 614 and one or more other services. For example, the software application 606 may parse the code 614 for a pattern indicative of respective relationships between the code 614 and services 612B, 612C, and 612D.

Once the software application 606 carries out the parsing, the software application 606 may then generate an association between the code 614 and services discovered to have respective relationships with the code 614 in accordance with the parsing. In practice, the generated association could be a file (e.g., a text file) specifying the discovered respective relationships between the code 614 and the services at issue. However, the generated association could take on any feasible form without departing from the scope of the present disclosure.

In some implementations, the software application 606 may also be configured to verify that a certain variable in the code 614 is actually used during execution of the program using code 614 before generating the association. In particular, in line with the discussion above, the pattern the code 614 may be a programmatic or environmental variable that is indicative of a respective relationship between the code 614 and a particular service. And the software application 606 may generate an association between the code 614 and this particular service only in response to verifying that the programmatic or environmental variable is to be used by the program during execution by computing resources of the third-party computing system 604. The software application 606 could carry out such a verification step in various ways.

For example, the software application 606 could be configured to determine whether the programmatic or environmental variable is part of a non-operative comment, such as using the above-described techniques. If the software application 606 determines that the programmatic or environmental variable is only used in a non-operative comment, then the software application 606 may responsively ignore this variable and may not generate the association at issue. Whereas, if the software application 606 determines that the programmatic or environmental variable is used in commands in code 614 that will execute or are likely to execute, then the software application 606 may responsively generate the association at issue. Other examples are also possible.

Once the software application 606 generates the association, the software application may then store, in the database 608, representations 618 of the code 614, the discovered service(s), and the association therebetween as configuration items. These stored representations 618 may be accessible to user(s) of the managed network, such as via a graphical user interface on a client device configured to display the representations 618, which may in turn provide information that may help better assess the managed network's usage of various services provided a third-party computing system 604.

In some implementations, the software application 606 may also be configured to generate and then store, in the database 608, a service map in accordance with the representations 618. This generated service map may be a definition of a graph that represents the code 614 as a node, the discovered service(s) as respective nodes, and the association therebetween as links. Further, the software application 606 could provide, to the client device 602 for display, a representation 620 of the service map in accordance with the stored definition. The software application 606 could do so in response to receipt, from the client device 602, of a request for the service map, among other options. In any case, when the client device 602 receives the representation 620, the client device 602 may visually display the representation 620 on a graphical user interface in the browser 610, among other possibilities.

In this regard, the graphical user interface may include selectable control(s) that enable editing of the representation 620 of the service by way of the graphical user interface. For example, the graphical user interface may include a selectable control that enables removal of a link between a node representing the code 614 and a node representing a particular one of the discovered services, so that the representation 620 of the service map no longer illustrates a relationship between the code 614 and this particular service. In another example, the graphical user interface may include selectable control that enables addition (i) of a new node representing of a different service that may not have been discovered by the software application 606 and (ii) of a link between this new node and the node representing the code 614. This representation 620 may be edited to illustrate a respective relationship between the code 614 and this different service provided by the third-party computing system 604. Other examples are also possible.

Figure 7A:
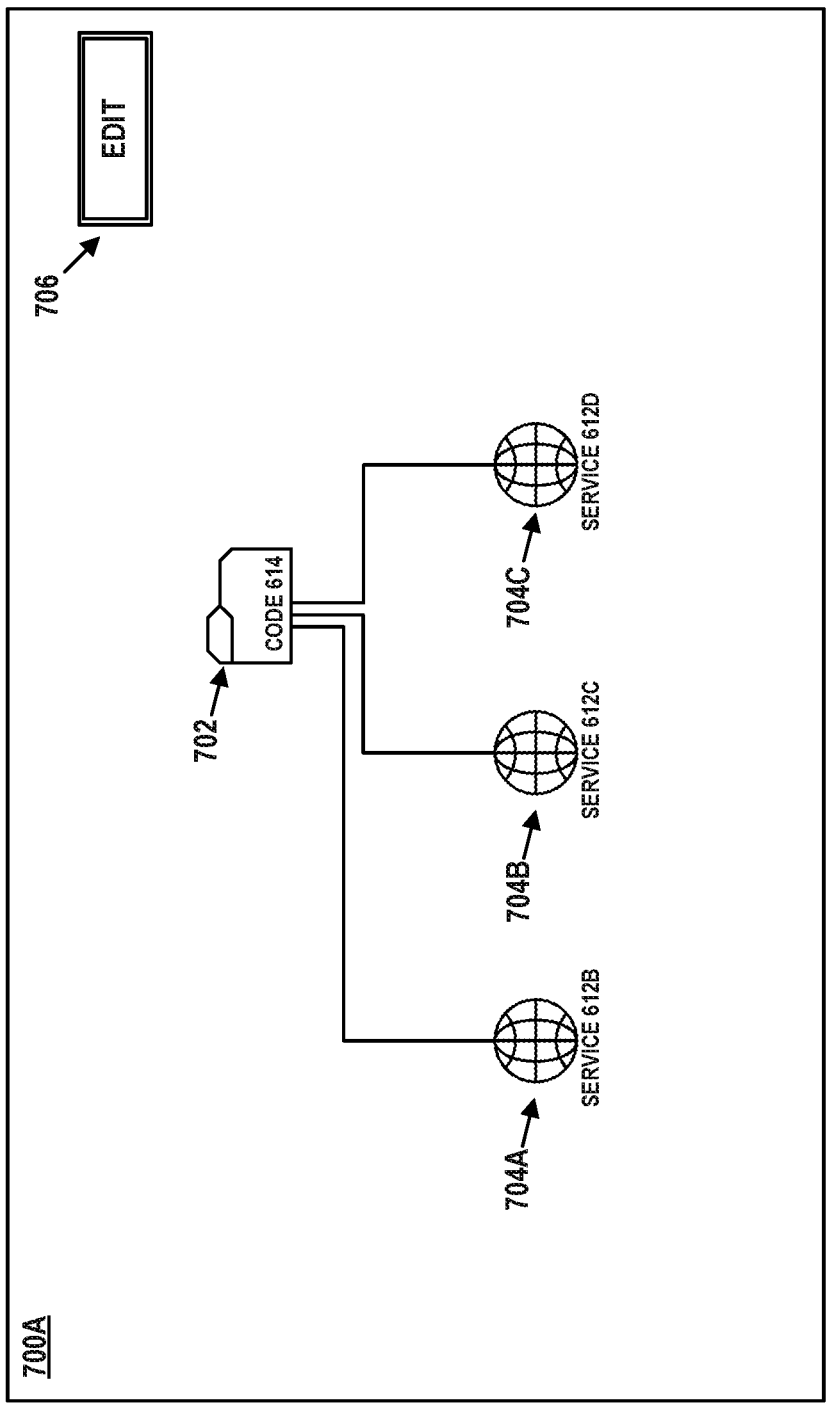
FIG. 7A depicts a graphical user interface representation of a service map, in accordance with example embodiments.

FIG. 7A illustrates a graphical user interface 700A that visually displays the representation 620 of the service map. This service map illustrates respective relationships between the code 614 and services provided by the third-party computing system 604, as discovered by the software application 606 in line with the discussion above.

More specifically, software application 606 may obtain code 614 in line with the discussion above. By way of example (and without limitation), at least a portion of the code 614 may be as follows:

```
{
    .....URL 123 = new
    URL("user123.service612B.computingsystem604.com");....
    ......New InputStreamReader (123.openStream( ));....
    ......getUserName(computingsystem604:service612C: XYZ453);....
    ......getUserID(sv612D);....
}
```

Given this, in line with the examples discussed above, the software application 606 may parse code 614 and, in doing so, may determine (i) that the URL "user123.service612B.computingsystem604.com" indicates a relationship between the code 614 and service 612B, (ii) that the resource name of "computingsystem604:service612C: XYZ453" indicates a relationship between the code 614 and service 612C, and (iii) that environmental variable "sv612D" indicates a relationship between the code 614 and service 612D. Thus, the software application 606 may ultimately generate the representation 620 of the service map to specify the code 614 as a node in a graph, discovered services 612B-612D as respective nodes in the graph, and the association therebetween as respective links.

Accordingly, as shown in FIG. 7A, the visually displayed representation 620 of the service map illustrates the code 614 as a node 702 in a graph, discovered services 612B-612D as respective nodes 704A, 704B, and 704C in the graph, and the association therebetween as respective links. Moreover, the graphical user interface 700A shows an "EDIT" button 706, which is a selectable graphical feature that may enable editing of the visually displayed representation 620 of the service map.

Figure 7B:
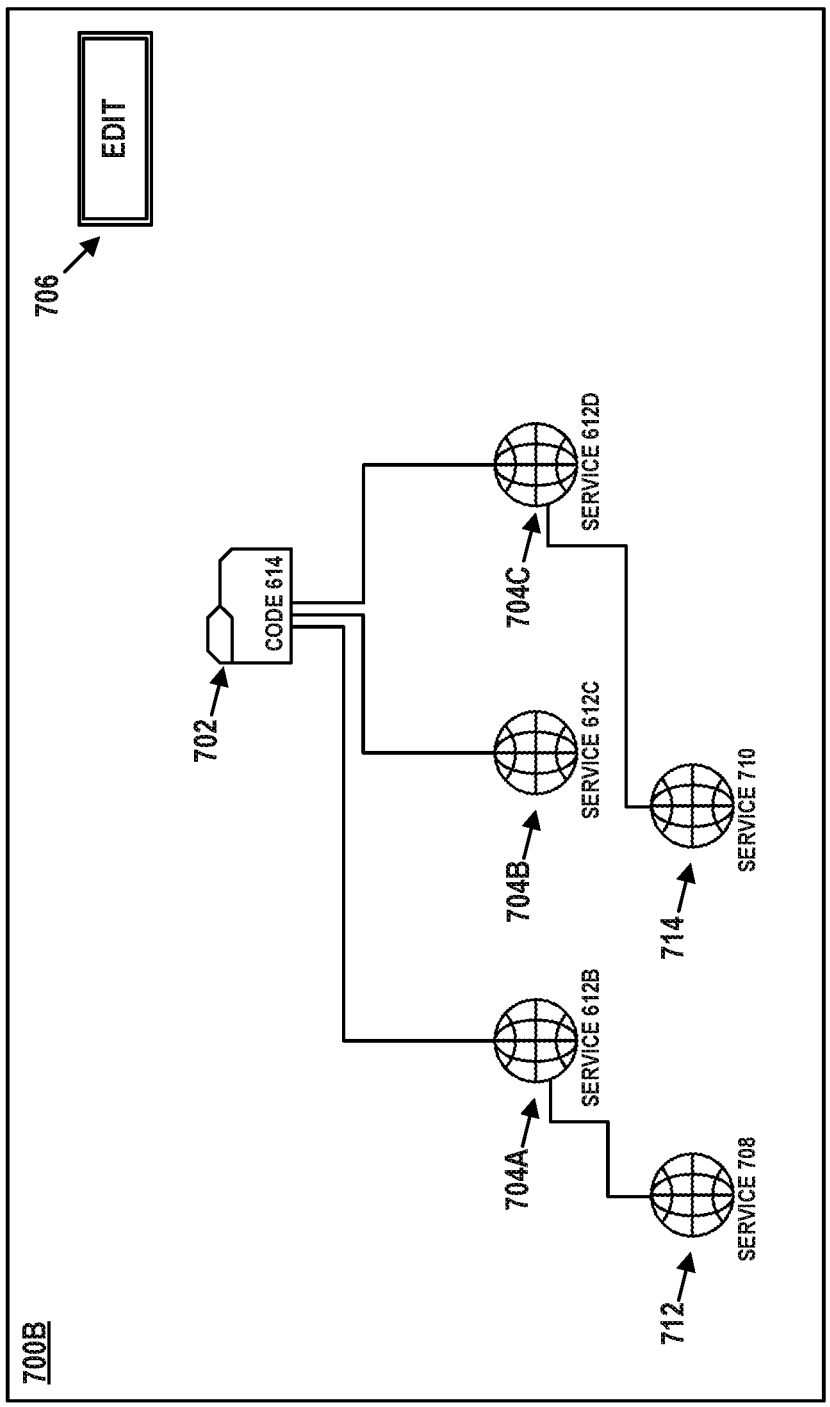
FIG. 7B depicts another graphical user interface representation of a service map, in accordance with example embodiments.

In a further aspect, FIG. 7B illustrates a graphical user interface 700B that visually displays another representation of the service map, which shows additional nodes and links in the graph. Such a visually displayed representation may help an enterprise even better assess its managed network's usage of various services.

In particular, once respective relationships between the code 614 and services 612B-612D are discovered, discovery procedures disclosed herein could be used to determine respective relationships between services 612B-612D and other services. For example, software application 606 may determine a respective relationship between code 614 and service 612B, and then determine a respective relationship between service 612B and service 708. Similarly, software application 606 may determine a respective relationship between code 614 and service 612D, and then determine a respective relationship between service 612D and service 710.

Accordingly, the representation that is visually display on graphical user interface 700B includes the features as shown in FIG. 7A, and also illustrates the further discovered services 708 and 710 as respective nodes 712 and 714 in the graph, an association between service 612B and service 708 as a respective link, and an association between service 612D and service 710 as another respective link. Other illustrations are possible as well.

VIII. EXAMPLE OPERATIONS

Figure 8:
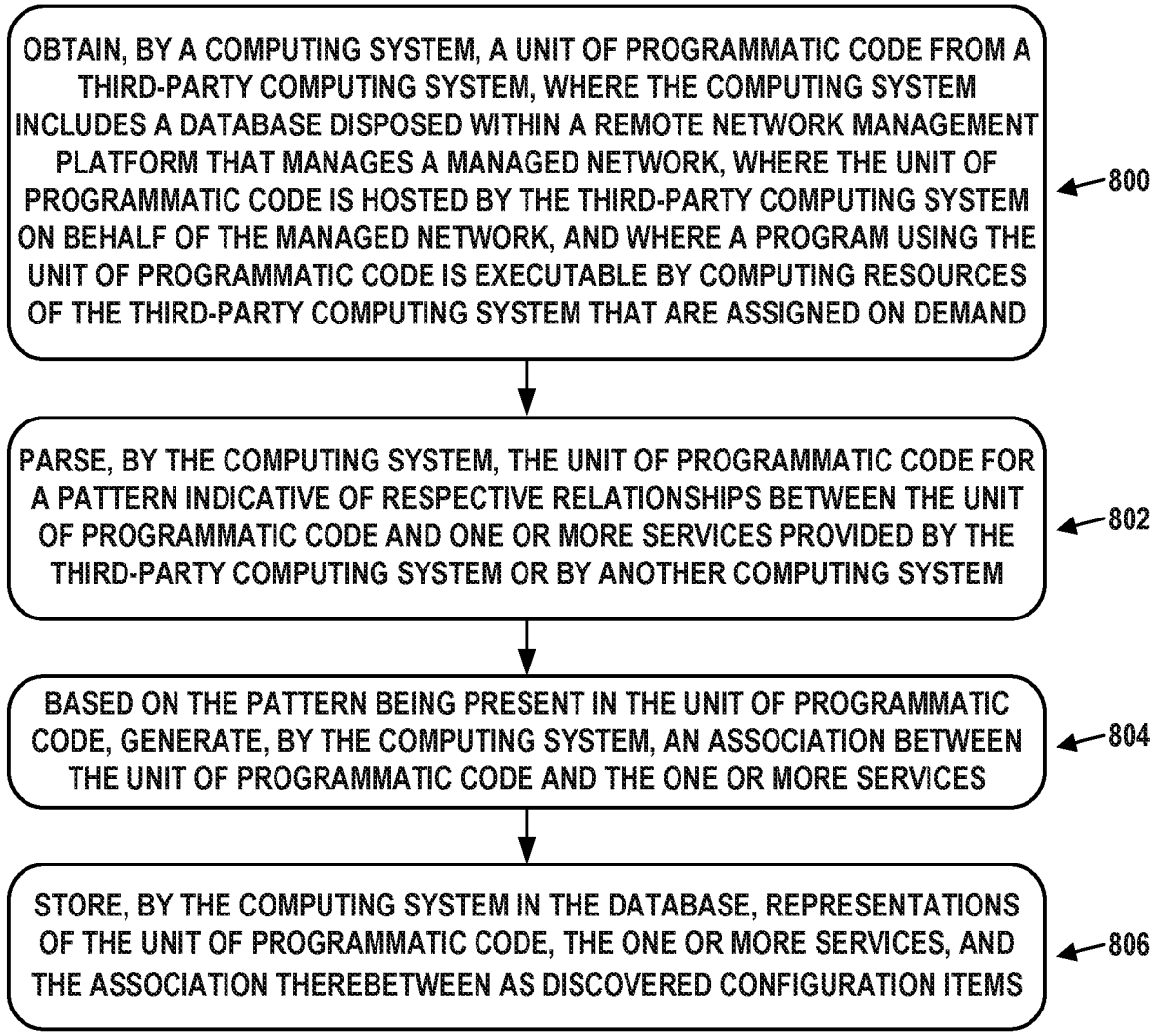
FIG. 8 is another flow chart, in accordance with example embodiments.

FIG. 8 is a flow chart illustrating an example embodiment. The process illustrated by FIG. 8 may be carried out by a computing system, such as computing device 100, and/or a cluster of computing devices, such as server cluster 200. However, the process can be carried out by other types of systems, devices, or device subsystems. For example, the process could be carried out by a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 800 may involve obtaining, by a computing system, a unit of programmatic code from a third-party computing system, where the computing system includes a database disposed within a remote network management platform that manages a managed network, where the unit of programmatic code is hosted by the third-party computing system on behalf of the managed network, and where a program using the unit of programmatic code is executable by computing resources of the third-party computing system that are assigned on demand.

Block 802 may involve parsing, by the computing system, the unit of programmatic code for a pattern indicative of respective relationships between the unit of programmatic code and one or more services provided by the third-party computing system or by another computing system.

Block 804 may involve, based on the pattern being present in the unit of programmatic code, generating, by the computing system, an association between the unit of programmatic code and the one or more services.

Block 806 may involve storing, by the computing system in the database, representations of the unit of programmatic code, the one or more services, and the association therebetween as discovered configuration items.

In some embodiments, a software application of the computing system may carry out discovery of serverless resources using the operations of blocks 800-806.

In some embodiments, the software application may be configured to execute on one or more of (i) a server device disposed within the remote network management platform or (ii) a server device disposed within the managed network.

In some embodiments, the unit of programmatic code may include one or more of source code, object code, a configuration file, a log file, or an environment variable.

In some embodiments, the program using the unit of programmatic code is executable by computing resources of the third-party computing system in response to a trigger event. The trigger event may be initiated by the software application, by a different software application associated with the remote network management platform, by a software application associated with the third-party computing system, or by a software application operating on a client device remotely accessing the third-party computing system.

In some embodiments, obtaining the unit of programmatic code from the third-party computing system may involve: transmitting, to the third-party computing system, a request for the unit of programmatic code, and receiving, from the third-party computing system, the unit of programmatic code in response to the request.

In some embodiments, one or more of the parsing, the generating, or the storing may occur independently from the program using the unit of programmatic code being executed by computing resources of the third-party computing system.

In some embodiments, the one or more services provided by the third-party computing system may include one or more of (i) another unit of programmatic code hosted by the third-party computing system on behalf of the managed network, (ii) a third-party software application, (iii) a third-party database, or (iv) a third-party server device.

In some embodiments, the unit of programmatic code may include source code or a configuration file, and parsing the unit of programmatic code may involve ignoring non-operative comments in the unit of programmatic code.

In some embodiments, parsing the unit of programmatic code may involve: determining that the unit of programmatic code includes a particular variable that has a particular format and that identifies a particular service, from among the one or more services, in accordance with the particular format.

In such embodiments, the particular variable may be one or more of a uniform resource locator (URL), a fully qualified domain name (FQDN), a resource name, or a function name.

Additionally or alternatively, in such embodiments, the software application may have access to formatting information that specifies a unique format respectively for each of a plurality of types of services provided by the third-party computing system or by another computing system, and the software application may be configured to use the formatting information as a basis for determining that the unit of programmatic code includes the particular variable.

In such embodiments, the formatting information may be contained in one or more of (i) the database disposed within the remote network management platform (ii) a third-party database of the third-party computing system or (iii) the software application.

In some embodiments, parsing the unit of programmatic code may involve: determining that the unit of programmatic code includes a particular environmental variable that is mapped to a particular value; and determining that the particular value has a particular format and identifies a particular service, from among the one or more services, in accordance with the particular format.

In such embodiments, the software application may have access to mapping information that maps a plurality of environmental variables to respective values, and the software application may be configured to use the mapping information as basis for determining that the unit of programmatic code includes the particular environmental variable.

In some embodiments, the pattern may include a programmatic or environmental variable, and the operations may further include: verifying that the programmatic or environmental variable is to be used by the program when the program is executed by computing resources of the third-party computing system. In such embodiments, generating the association may be responsive to the verifying.

In some embodiments, the software application may be further configured to: generate a definition of a graph that represents the unit of programmatic code as a node, the one or more services as respective nodes, and the association therebetween as respective links; and store the definition of the graph in the database.

In such embodiments, the software application may be further configured to: provide, to a client device associated with the managed network, a representation of a graphical user interface that displays the graph in accordance with the stored definition.

In such embodiments, the graphical user interface may include one or more selectable controls that enable editing of the graph by way of the graphical user interface.

IX. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
a database disposed within a remote network management platform that manages a managed network; and
a software application, associated with the remote network management platform, configured to carry out discovery of serverless resource using operations including:
obtaining a unit of programmatic code from a third-party computing system, wherein the unit of programmatic code is hosted by the third-party computing system on behalf of the managed network, and wherein a program using the unit of programmatic code is executable by computing resources of the third-party computing system that are assigned on demand;
parsing the unit of programmatic code for a pattern indicative of respective relationships between the unit of programmatic code and one or more services provided by the third-party computing system or by another computing system;
based on the pattern being present in the unit of programmatic code, generating an association between the unit of programmatic code and the one or more services; and
storing, in the database, representations of the unit of programmatic code, the one or more services, and the association therebetween as discovered configuration items.

2. The computing system of claim 1, wherein the software application is configured to execute on one or more of (i) a server device disposed within the remote network management platform or (ii) a server device disposed within the managed network.

3. The computing system of claim 1, wherein the unit of programmatic code comprises one or more of source code, object code, a configuration file, a log file, or an environment variable.

4. The computing system of claim 1, wherein the program using the unit of programmatic code is executable by computing resources of the third-party computing system in response to a trigger event, and wherein the trigger event is initiated by the software application, by a different software application associated with the remote network management platform, by a software application associated with the third-party computing system, or by a software application operating on a client device remotely accessing the third-party computing system.

5. The computing system of claim 1, wherein obtaining the unit of programmatic code from the third-party computing system comprises:
transmitting, to the third-party computing system, a request for the unit of programmatic code, and
receiving, from the third-party computing system, the unit of programmatic code in response to the request.

6. The computing system of claim 1, wherein one or more of the parsing, the generating, or the storing occurs independently from the program using the unit of programmatic code being executed by computing resources of the third-party computing system.

7. The computing system of claim 1, wherein the one or more services provided by the third-party computing system comprise one or more of (i) another unit of programmatic code hosted by the third-party computing system on behalf of the managed network, (ii) a third-party software application, (iii) a third-party database, or (iv) a third-party server device.

8. The computing system of claim 1, wherein the unit of programmatic code comprises source code or a configuration file, and wherein parsing the unit of programmatic code comprises ignoring non-operative comments in the unit of programmatic code.

9. The computing system of claim 1, wherein parsing the unit of programmatic code comprises:
determining that the unit of programmatic code includes a particular variable that has a particular format and that identifies a particular service, from among the one or more services, in accordance with the particular format.

10. The computing system of claim 9, wherein the particular variable is one or more of a uniform resource locator (URL), a fully qualified domain name (FQDN), a resource name, or a function name.

11. The computing system of claim 9,
wherein the software application has access to formatting information that specifies a unique format respectively for each of a plurality of types of services provided by the third-party computing system or by another computing system, and
wherein the software application is configured to use the formatting information as a basis for determining that the unit of programmatic code includes the particular variable.

12. The computing system of claim 11, wherein the formatting information is contained in one or more of (i) the database disposed within the remote network management platform, (ii) a third-party database of the third-party computing system, or (iii) the software application.

13. The computing system of claim 1, wherein parsing the unit of programmatic code comprises:
determining that the unit of programmatic code includes a particular environmental variable that is mapped to a particular value; and determining that the particular value has a particular format and identifies a particular service, from among the one or more services, in accordance with the particular format.

14. The computing system of claim 13,
wherein the software application has access to mapping information that maps a plurality of environmental variables to respective values, and
wherein the software application is configured to use the mapping information as basis for determining that the unit of programmatic code includes the particular environmental variable.

15. The computing system of claim 1, wherein the pattern includes a programmatic or environmental variable, wherein the operations further include:
verifying that the programmatic or environmental variable is to be used by the program when the program is executed by computing resources of the third-party computing system, and
wherein generating the association is responsive to the verifying.

16. The computing system of claim 1, wherein the software application is further configured to:
generate a definition of a graph that represents the unit of programmatic code as a node, the one or more services as respective nodes, and the association therebetween as respective links; and
store the definition of the graph in the database.

17. The computing system of claim 16, wherein the software application is further configured to:
provide, to a client device associated with the managed network, a representation of a graphical user interface that displays the graph in accordance with the stored definition.

18. The computing system of claim 17,
wherein the graphical user interface includes one or more selectable controls that enable editing of the graph by way of the graphical user interface.

19. A method comprising:
obtaining, by a computing system, a unit of programmatic code from a third-party computing system, wherein the computing system includes a database disposed within a remote network management platform that manages a managed network, wherein the unit of programmatic code is hosted by the third-party computing system on behalf of the managed network, and wherein a program using the unit of programmatic code is executable by computing resources of the third-party computing system that are assigned on demand;
parsing, by the computing system, the unit of programmatic code for a pattern indicative of respective relationships between the unit of programmatic code and one or more services provided by the third-party computing system or by another computing system;
based on the pattern being present in the unit of programmatic code, generating, by the computing system, an association between the unit of programmatic code and the one or more services; and
storing, by the computing system in the database, representations of the unit of programmatic code, the one or more services, and the association therebetween as discovered configuration items.

20. An article of manufacture including a non-transitory computer-readable medium, having stored thereon program instructions that, upon execution by a computing system that includes a database disposed within a remote network management platform that manages a managed network, cause the computing system to perform operations comprising:
obtaining a unit of programmatic code from a third-party computing system, wherein the unit of programmatic code is hosted by the third-party computing system on behalf of the managed network, and wherein a program using the unit of programmatic code is executable by computing resources of the third-party computing system that are assigned on demand;
parsing the unit of programmatic code for a pattern indicative of respective relationships between the unit of programmatic code and one or more services provided by the third-party computing system or by another computing system;
based on the pattern being present in the unit of programmatic code, generating an association between the unit of programmatic code and the one or more services; and
storing, in the database, representations of the unit of programmatic code, the one or more services, and the association therebetween as discovered configuration items.

* * * * *